Oct. 12, 1948.  J. J. GANO ET AL  2,451,027
CUTTING MACHINE FOR PLASTIC MATERIAL
Filed Feb. 17, 1945  7 Sheets-Sheet 2

Fig. 2

INVENTORS
Joseph J. Gano
Lyon W. Richardson
John P. Chandler
BY
their Attorney Oct. 12, 1948.   J. J. GANO ET AL   2,451,027
CUTTING MACHINE FOR PLASTIC MATERIAL
Filed Feb. 17, 1945   7 Sheets-Sheet 5

INVENTORS
Joseph J. Gano
BY Leon W. Richardson
John P. Chandler
their Attorney

Oct. 12, 1948.　　　J. J. GANO ET AL　　　2,451,027
CUTTING MACHINE FOR PLASTIC MATERIAL
Filed Feb. 17, 1945　　　7 Sheets-Sheet 6

INVENTORS
Joseph J. Gano
BY Leon W. Richardson
John P. Chandler
their Attorney

Oct. 12, 1948.                J. J. GANO ET AL                 2,451,027
                    CUTTING MACHINE FOR PLASTIC MATERIAL
Filed Feb. 17, 1945                                    7 Sheets-Sheet 7

Fig. 13

INVENTORS
Joseph J. Gano
BY Leon W. Richardson
John P. Chandler
their Attorney

Patented Oct. 12, 1948

2,451,027

UNITED STATES PATENT OFFICE 2,451,027

CUTTING MACHINE FOR PLASTIC MATERIAL

Joseph J. Gano, Worcester, and Leon W. Richardson, Cherry Valley, Mass., assignors to Controls Laboratories, Inc., a corporation of Delaware Application February 17, 1945, Serial No. 578,514

5 Claims. (Cl. 25—108)

This invention relates to new and useful improvements in cutting devices for extruded or otherwise formed plastic materials, and has for its principal object the provision of a novel machine for making one or a plurality of transverse cuts in a column of extruded material, the cuts being of predetermined contour.

In the manufacture of bricks, tile, building blocks generally, and other articles made from materials which are "plastic" in a broad sense, the extrusion process is found to be less expensive than molding the entire external contour, as well as the voids in the case of a hollow article. No particular difficulty is experienced in making transverse cuts in the column of extruded material so long as such cuts lie wholly in a plane disposed at right angles to the longitudinal walls of the brick, tile, block, or other article. When, however, the transverse or end walls of the brick or block have recesses, projections, or other surface contours disposed out of the general plane of such walls, difficulty is always experienced unless the moving column is stopped during the cutting operation.

It is an object of the present invention to provide a machine to perform the operation quickly and effectively without the necessity of interrupting the movement of the extruded column. Another object of the present invention is the provision of a brick-cutting machine employing one or more cutting wires mounted in pivoted frames wherein improved means are provided for guiding the cutting wire during the cutting operation to make cuts of predetermined contour.

A further object of the invention is to provide, in a cutting machine of this character, novel means for quickly altering the structure so as to cut bricks or other articles of different lengths and also of different contours.

The machine of the present invention may be manually operated, or some suitable power drive may be employed, both forms of the invention being illustrated in the drawings.

A movable frame or carriage 10 is mounted on a fixed base frame 11, the carriage being capable of movement for a sufficient distance, say, three or four inches, to permit such carriage and the cutting elements carried thereby to travel with the column of clay or other extruded material during the cutting operation. The base frame may include a pair of spaced, longitudinally-disposed angles 12 at the lower end of such frame, and another pair of spaced, longitudinally-disposed angles 13 at the upper end thereof, the upper and lower pairs being supported in such spaced relation by means of vertical angles 14, and the opposed pairs 12 and 13 on opposite sides of the frame structure being maintained in such spaced relation by means of transversely-disposed angles 15. The frame may be of welded construction, and, if desired, additional bracing members may also be provided.

Base frame 11 may be supported on the floor 186, and may be adjustably mounted in relation thereto by means of threaded posts 20 mounted at their lower ends in sockets 21, the upper ends of the posts passing through apertures (not shown) in lower frame members 12, and being supported relative thereto by means of nuts 22 disposed above and below the horizontal portions of such frame members 12. It will thus be seen that the position of frame 11 relative to the floor may be adjusted vertically within reasonable limits. Short trackways 23 are secured on the upper or horizontal surfaces of frame members 13, which trackways support flanged wheels 24 mounted on transverse shafts 25. If desired, frame 11 could be eliminated, and the movable carriage be carried on trackways supported on the floor.

Figure 3:
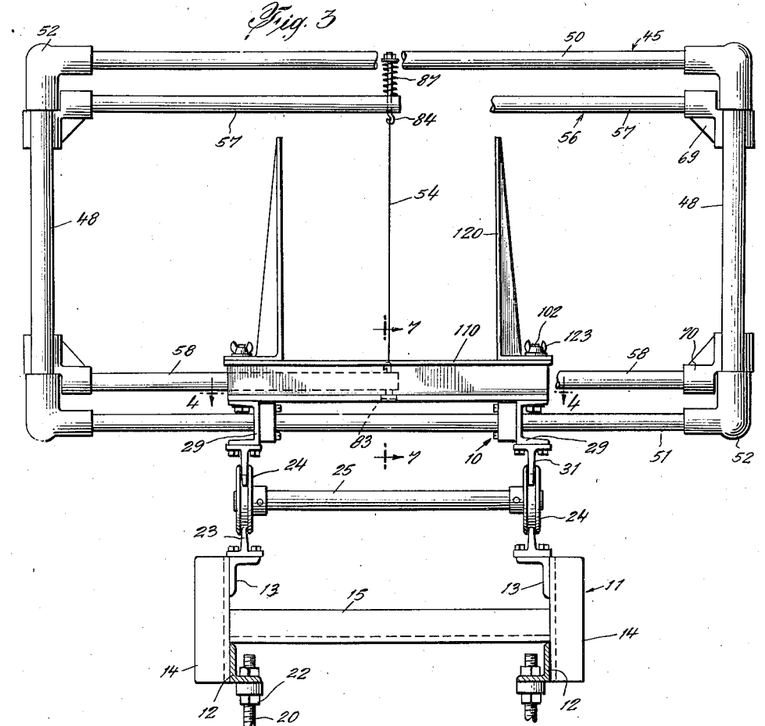
Fig. 3 is an end elevation, such view being of the left-hand end of the machine illustrated in Figs. 1 and 2.

Movable frame or carriage 10 may include a pair of spaced, longitudinally-disposed frame members 29 shown in Fig. 3 as comprising channels, such frame members being maintained in their spaced-apart relation by means of transverse frame members 30 which may also be formed as channels or angles, as desired. The rectangular frame may, if needed, be additionally braced. On the lower surfaces of channels 29 there are secured trackways 31 having track portions 32 on their lower surfaces, which terminate in downwardly-extending arcuate portions 33, which limit the longitudinal movement of carriage 10.

Figures 7, 8:
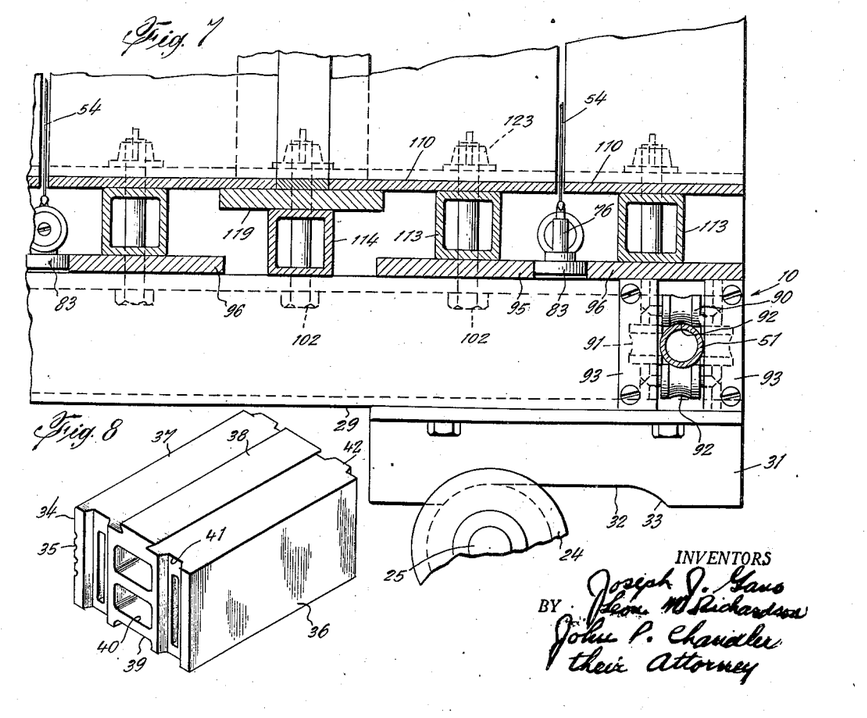
Fig. 7 is a broken vertical section taken on line 7—7 of Fig. 3.
Fig. 8 is a perspective view of one form of brick which may be cut by the machine of the present invention.

The clay or other plastic material is fed to the platen on carriage 10 by means which are not shown, and which form no part of the present invention. Such means may comprise the usual screw element mounted within a housing which forces the plastic material through a die appropriately shaped to form the desired longitudinal openings in the brick, as well as to form the proper exterior contour. One such brick is shown in Fig. 8 wherein the inner wall 34 has a plurality of longitudinal recesses 35, the outer wall 36 being smooth. Upper wall 37 may have ribs 38 which form handle elements. The lower wall may have a recess 39 and a plurality of openings 40. One end wall has vertical recesses 41, and the other end wall has complemental projections 42, although both end walls may have the recesses. It will be appreciated, however, that a wide variety of extruded articles may be cut with the machine of the present invention, and the brick illustrated in Fig. 8 is illustrative only. It will be further understood that the brick, tile or other element which is cut may be solid as well as hollow.

Figure 1:
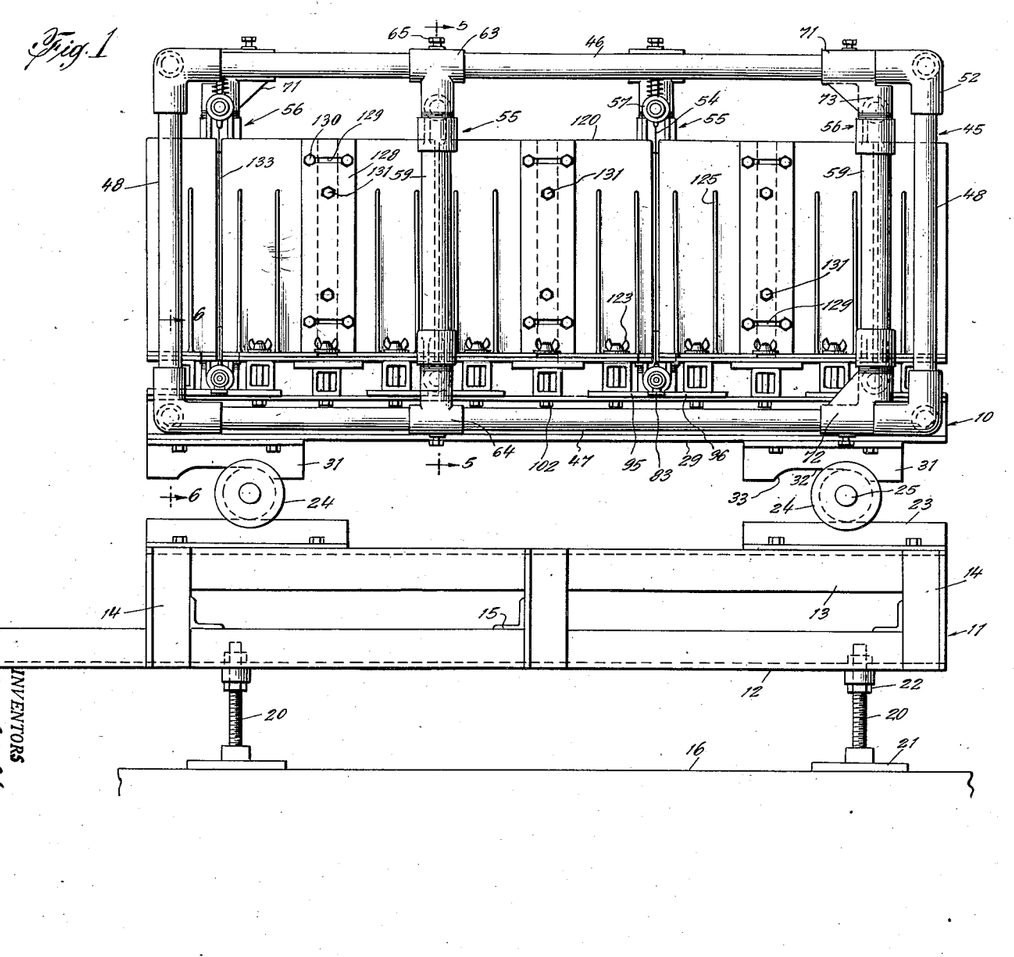
Fig. 1 is a side elevation of a cutting machine forming one embodiment of the present invention.
Figure 2:
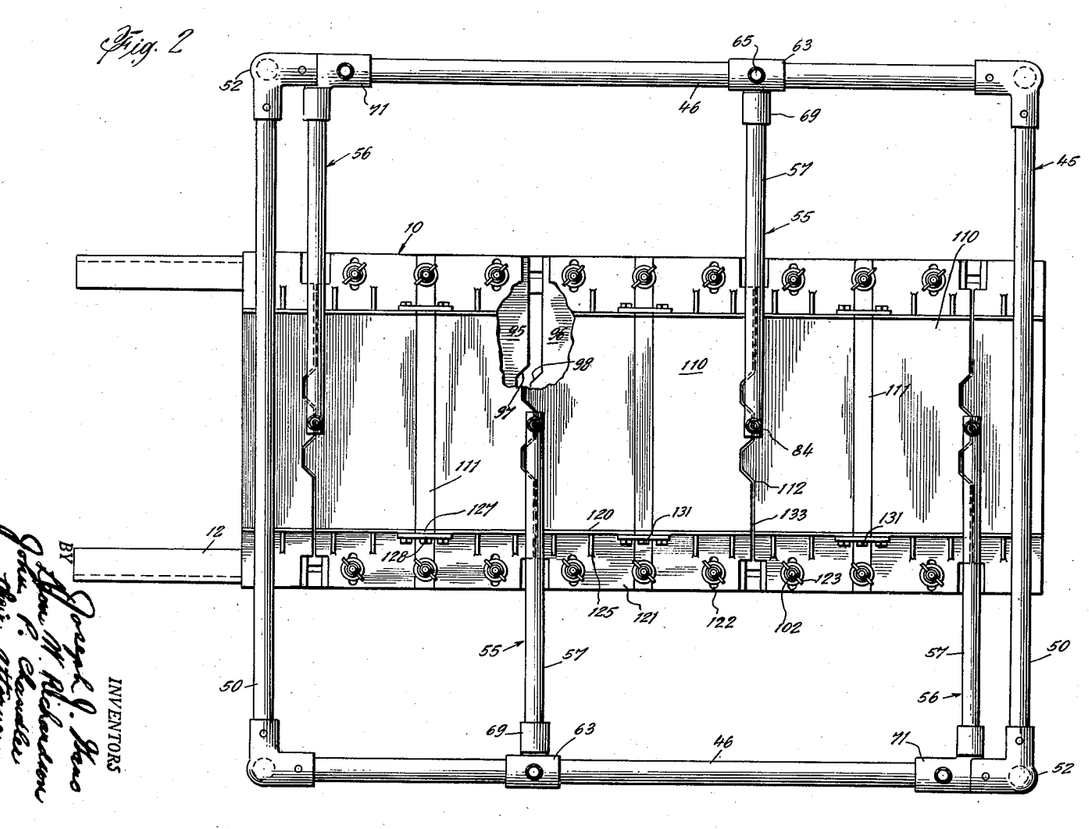
Fig. 2 is a top plan view thereof.

The extruded material may be continuously fed to the platen at either end of the movable carriage, although for purposes of illustration it may be assumed that the column of material is fed to the left-hand end of the platen when viewed as in Figs. 1 and 2. Suitable means (not shown) may be provided for holding the carriage in its maximum leftward position, as illustrated in Fig. 1, and when the column of extruded material reaches an appropriate point adjacent the cutting wire at the right-hand end of the platen, such holding means may be released and the carriage permitted to travel with the extruded material during the operation of making the transverse cuts in the column. Thus, the carriage, during such operation, will have moved from the position illustrated in Fig. 1 to that illustrated in Fig. 7. At the finish of the cutting operation, the carriage may be returned to the position of Fig. 1 while the column of clay is still moving forward.

The frame structure 45, which is transversely movable of carriage 10, and which supports the cutting wires, will now be described. The frame 45 is a three-dimensional affair of generally rectangular shape. It is of tubular construction and comprises upper and lower longitudinal members 46 and 47 on each side thereof, vertical members 48 at each corner thereof, and upper and lower members 50 and 51 which are disposed transversely of the frame. All of these tubular members are joined at the corners of the frame structure by means of corner brackets 52, the terminals of the tubular members being secured within the recesses in the brackets in any desired manner to give the frame structure appropriate rigidity.

Figure 5:
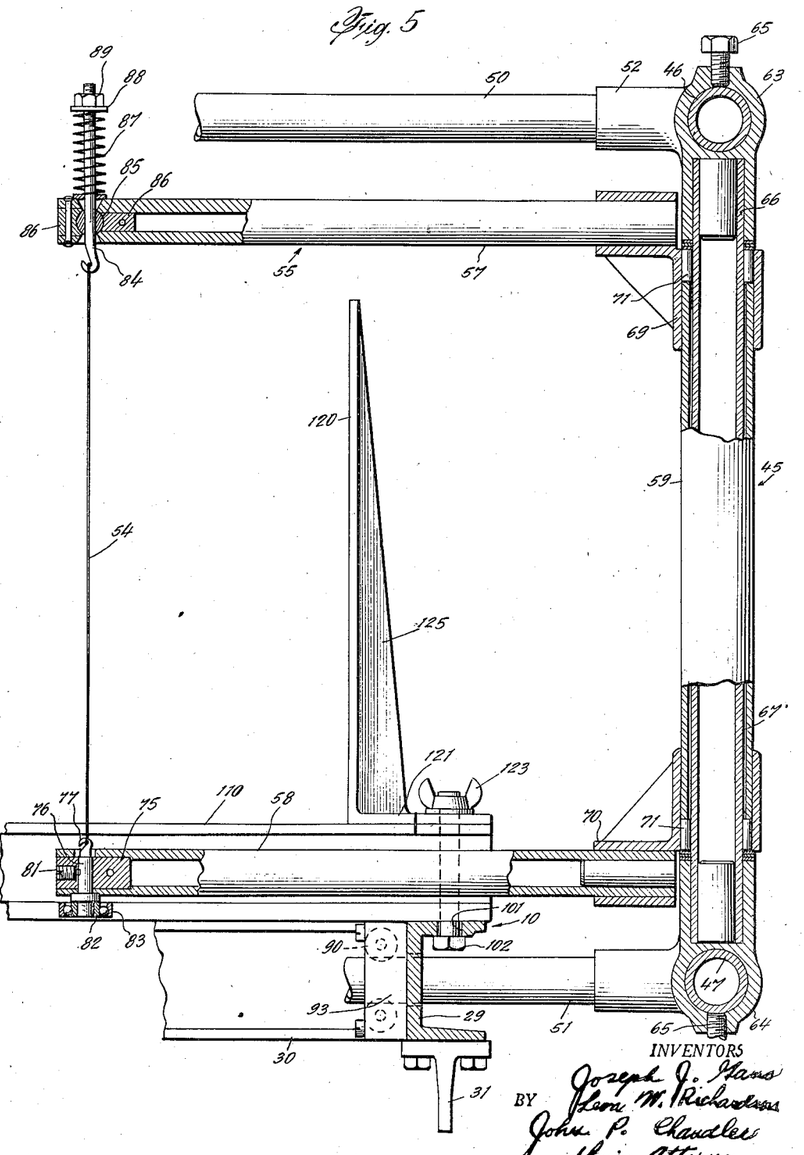
Fig. 5 is a broken vertical section taken on line 5—5 of Fig. 1.
Figure 6:
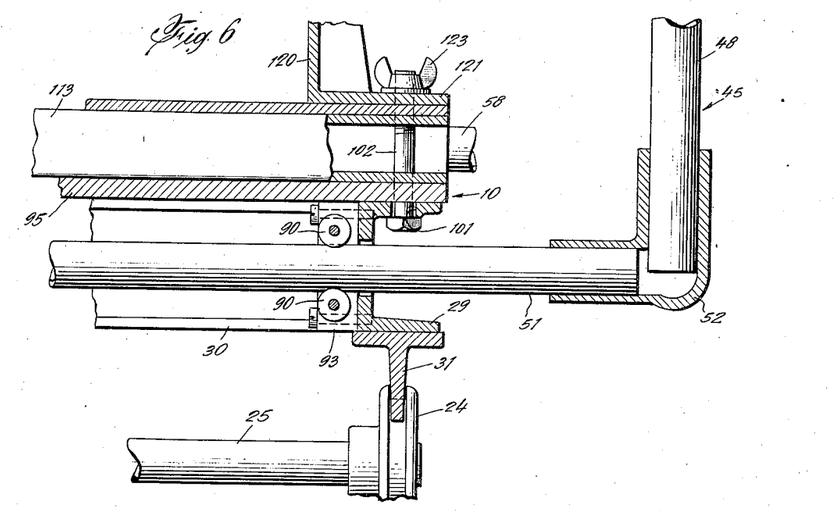
Fig. 6 is a broken vertical section taken on line 6—6 of Fig. 1.

In the embodiment illustrated in Fig. 2 of the drawing, four cutting wires 54 are illustrated, each of such wires being mounted in intermediate frames 55 and terminal frames 56. One intermediate, and one terminal frame are carried on each side of frame structure 45. Each cutting-wire frame comprises upper and lower horizontal tubular arms 57 and 58 connected by means of a vertical member 59, such cutting frames being mounted on upper and lower longitudinal frame members 46 and 47 in the following manner. Referring particularly to Fig. 5, it will be noted that there is provided an upper and a lower bracket 63 and 64, respectively. The horizontal bore in brackets 63 and 64 is of such size as to permit these brackets to be moved longitudinally of their supporting tubes 46 and 47, and they are secured in any desired position thereon by means of set screws 65. Vertical bore 66 in these brackets receives and rigidly supports the opposite terminals of tubular member 67, which carries on its outer surface cutting frame member 59. The inner diameter of member 59 is such as to permit free swinging movement on tube 67. Brackets 69 and 70 may be force-fitted at opposite ends to frame member 59, the horizontal portions thereof receiving the terminals of arms 57 and 58.

In order to make the swinging movement of frame 56 more free, a plurality of needle bearings 71 may be positioned at the opposite ends of tube 59, the inner race of the needle-bearing structure comprising the exterior of tube 67, and the outer race comprising the inner surface of brackets 69 and 70. If desired, of course, ball bearings or other equivalent structures may be employed in place of the needle bearings. All four cutting-wire frames 55 and 56 are of similar construction, except that in the intermediate frames 55 the vertical portions of brackets 63 and 64 are disposed substantially midway between the ends of the horizontal portion, whereas in terminal frames 56, brackets 71 and 72 are employed, and in such brackets the vertical portions 73 are offset relative to the horizontal portion in order to permit the cutting wire carried thereby to more nearly approach the ends of frame 45.

Each cutting wire 54 is formed with looped terminals, and is mounted in the following manner. Referring first to the lower end of the wire, it will be noted in Fig. 5 that a plug 75 is force-fitted in the free end of lower arm 58, such plug having a vertical aperture which receives a stud 76 having a hook 77 at its upper end which engages the loop of the wire. Stud 76 is secured within plug 75 by means of a set screw 81. At its lower end, stud 76 carries the inner race 82 of a ball-bearing element, the outer race forming a roller 83 which is received between the opposite faces of the templet hereinafter described which guides the free end of the frame during its cutting movement. Referring now to top arm 57, it will be noted that spindle 84 supports the loop at the upper end of the cutting wire, the spindle being mounted in a ball member 85 positioned within a two-piece socket 86 which may be secured in the outer terminal of the arm. Tension is imparted to the wire by means of spring 87 which engages the arm at its lower end, and engages a washer 88 at its upper end, the position of the washer being adjustable by means of nut 89. The purpose of the ball member 85 is to permit the cutting wire to flex more easily when a hard spot in the clay is struck, than if the spring alone were used.

Frame 45, which supports cutting frames 55 and 56, is journalled for transverse movement relative to carriage 10 by the following means shown particularly in Fig. 7. Upper and lower horizontal rollers 90, and opposed vertical rollers 91 having appropriate recesses 92 in their outer periphery, are journalled in plates 93 which are secured to the inner surfaces of channels 29 at their opposite ends. Recesses 92 are shaped to fit the exterior periphery of transverse tubes 51, such rollers providing free travel of frame 45 transversely of the movable carriage. Rollers 90 and 91 adjacent each corner of the carriage give an approved measure of support to frame 45 during its transverse movement, although other journal means for permitting free, straight-line reciprocating movement of frame 45 may be employed.

Figure 4:
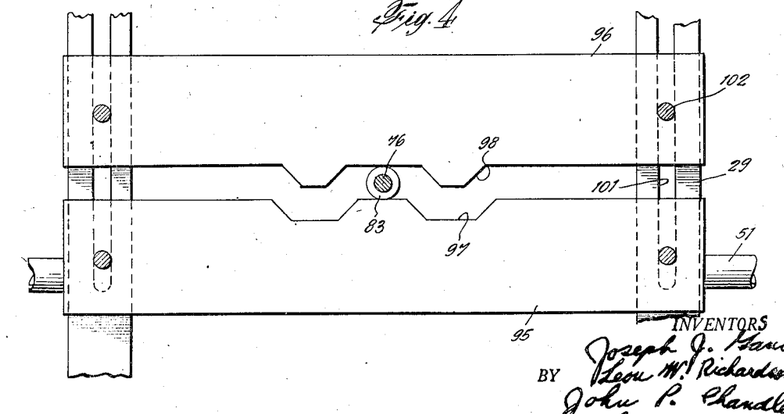
Fig. 4 is a horizontal section taken on line 4—4 of Fig. 3, the view showing the two plates forming the template for guiding the cutting element.

It was earlier pointed out that the cutting-wire frames 55 and 56 are movable longitudinally of frame 45 in order to permit bricks of different lengths to be cut. This arrangement necessitates the adjustability of the templates or cams which guide the free ends of the frames, which will now be described. Reference is had particularly to Fig. 4 which illustrates a template as comprising two plates 95 and 96, plate 95 having recesses 97 along its inner edge, and plate 96 having projections 98 which are complemental to recesses 97. The distance between the opposed edges of plates 95 and 96 is such as to permit roller 83 to be freely movable through the slot so formed, and accordingly it will be seen that as the cutting frames are moved transversely of frame 45, the cutting wire follows the contour of the slot in the template. Longitudinal frame members 29 are formed with longitudinal slots 101, and plates 95 and 96 are adjustably secured on the upper surface of channels 29 by means of bolts 102. Thus, the templates may be moved longitudinally of the carriage to various positions, and they may be removed with facility when templates having a different contour are to be installed. It will be appreciated that the templates may take many different forms.

It will be clear that a single template or cam could be used for guiding the cutting-wire frames by employing a suitable drag link connection between the frames, or a single template could be used for guiding the cutting-wire frames on each side of the carriage, and, also, that a single template could be used for each cutting-wire frame. The latter arrangement has been illustrated and described thus far in the specification, and for convenience these templates have been placed on the upper surface of frame members 29, which has necessitated the provision of spacer elements between such upper edge and the platen. In the event, of course, that the templates were placed below frame members 29, or above movable frame structure 45, or even to one side or the other of frame structure 45, the carriage structure, and paticularly the spacer elements, could be appropriately modified.

Since the platen must have transverse openings corresponding to the cam surface of the template to permit cutting wires 54 to pass therethrough, the platen must comprise a plurality of plates which are designated as 110. A single plate could be employed between each set of cutting wires, but this would necessitate providing a plurality of sets of plates, one size for each length of brick. It is preferred, however, to form each plate in two parts, and to vary the effective length thereof by providing an intermediate or filler plate 111, and in cases wherein it is necessary to increase or decrease the size of the brick, this can be accomplished so far as the platen is concerned by varying the size of filler plate 111, or, in some cases, eliminating it entirely. It will be noted in Fig. 2 that the meeting edges of the two adjacent plates 110 are formed with surfaces which are complemental, and which correspond to the contour of the template or cam, thus leaving a narrow slot 112 between such adjacent plates.

For the purpose of mounting plates 110 and 111 in spaced relation to the upper surface of frame members 29, filler blocks or tubes 113 and 114 may be provided. Filler blocks 113 are illustrated as being positioned on the upper surfaces of plates 95 and 96 forming a single template, and bolt 102 passes through block 113 and through the plates 110. Each bolt 102 also secures in position vertical plates for guiding the column of plastic material as it moves over the plates. Filler blocks 114 rest on the upper surface of frame members 29 and carry block 119 on its upper surface. Vertical guide plates 120 are formed with flanges 121 at their lower ends, and with reinforcing webs 125. The flanges rest on the upper surfaces of plates 110 and 111. In order to accommodate bricks of varying widths, flanges 121 have elongated slots 122 therein through which bolts 102 pass, such bolts carrying wing nuts 123 at their upper ends.

When platen filler plates 111 are used, vertical filler plates 127 are also employed. These plates are held in place by means of straddle pieces 128 which are provided with elongated slots 129 receiving bolts 130, the slots also receiving the bolts when filler plates 127 are not used. Bolts 131 secure the straddle pieces to the vertical filler plates. The effective length of each vertical guide plate, with or without a filler plate, is equal to the effective length of each platen section, thus leaving vertical slots 133 between the sections to permit cutting wire 54 to pass therethrough and completely out of the moving column of plastic material.

Figures 9, 10, 11, 12:
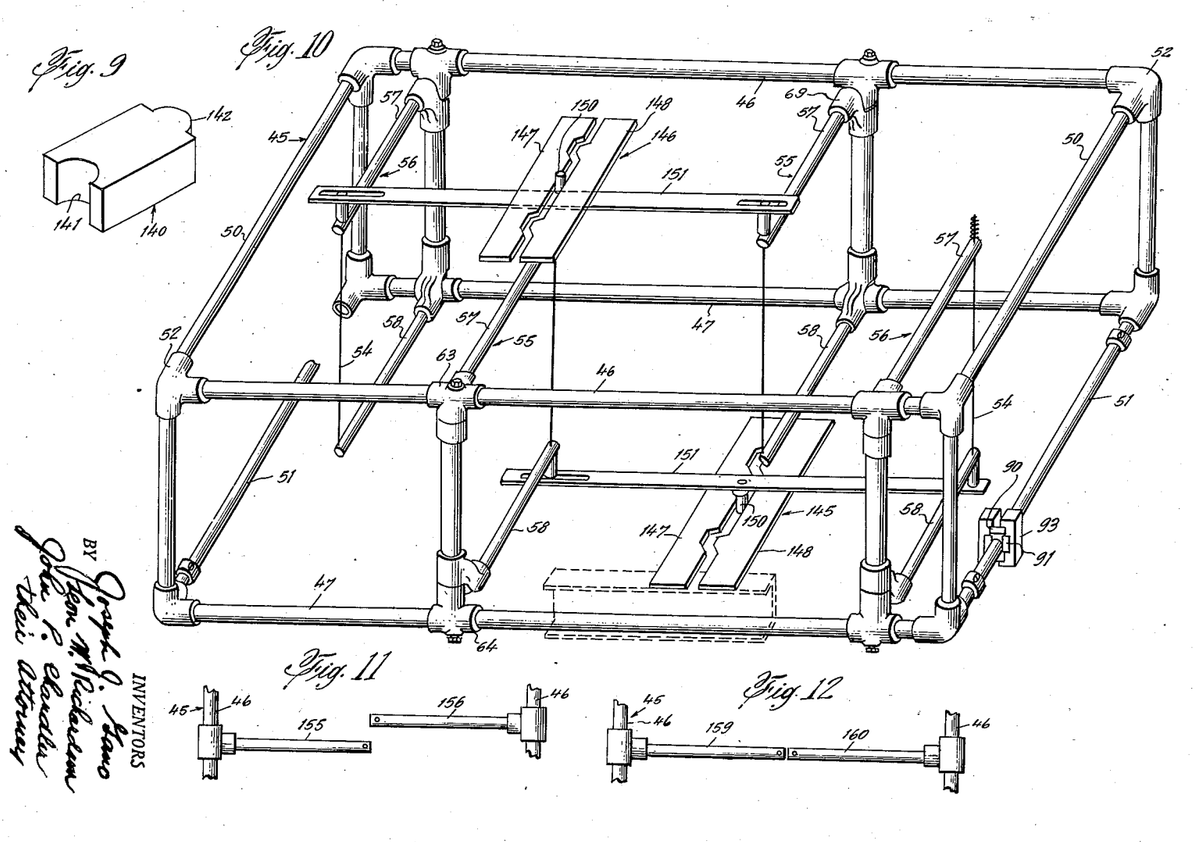
Fig. 9 is a perspective view of another form of brick which may be cut with the machine of the present invention.
Fig. 10 is an isometric view of the transversely movable frame showing a modified template arrangement for guiding the cutting wire frames.
Fig. 11 is a fragmentary top plan view showing a modified arrangement of the cutting wire frames wherein the cutting wires are adapted to cut recesses at each end of the brick.
Fig. 12 shows a modified arrangement for the same purpose.

Fig. 9 shows another type of brick 140, which, in this instance, is provided with no voids or openings, and is formed at one end thereof with a rather deep semi-circular recess 141, and at the opposite end with a similarly-shaped semi-circular projection 142. If desired, of course, the recesses 141 could be formed at each end of the brick, and likewise this brick may have longitudinal openings as well.

Fig. 10 shows a modified template arrangement. In the first embodiment of the invention, a single template or cam was employed for each cutting wire frame. In Fig. 10, however, one template 145 is provided below the transversely movable frame 45, and another template 146 is provided above the frame. Each template is shown as comprising two plates 147 and 148, as in the first embodiment, and suitable means associated with the carriage may be provided to support these templates. A roller 150 carried on a drag link 151 moves in the recess between plates 147 and 148, and each drag link is secured at opposite ends thereof to the cutting wire frames. The drag link below frame 45 is secured to lower arms 58 of cutting wire frames 55 and 56 located on one side of transversely movable frame 45. The drag link 151 located above frame 45 is secured to upper arms 57 of the frames 56 and 55 located on the opposite side of frame 45.

It was earlier pointed out that in some instances it may be desirable to form a recess at each end of the brick, and schematic showings of two arrangements for accomplishing this result are illustrated in Figs. 11 and 12. In this instance, cutting wire frames 155 and 156 are carried in the usual manner on frame 45, and are only slightly spaced apart. The pair 155 and 156 of these frames is provided at each end of the brick to be cut, so that if this arrangement were applied to the transversely movable frame 45 shown in Fig. 10, four pairs of these frames 155 and 156 would be provided. A template (not shown) may be employed for guiding each cutting wire frame, the templates causing the cutting wire frames to move in opposite directions as the recesses or notches in the ends of the brick are to be cut.

In the arrangement of Fig. 12, cutting wire frames 159 and 160 are transversely aligned. In this instance, it will be necessary to make frame 45 slightly wider than is shown in the other embodiments of the invention. In this arrangement, separate templates (not shown) may also be employed for guiding the frames in opposite directions as the notches and recesses are being cut. The advantage of the arrangement of Fig. 12 resides in the fact that no clay in the moving column is wasted, whereas in the arrangement of Fig. 11 there will be an unused portion cut between adjacent ends of two bricks, such portion having a width equal to the spacing between frames 155 and 156. Strictly speaking, however, the clay is not wasted since it may be readily returned to the hopper and reused.

Figure 13:
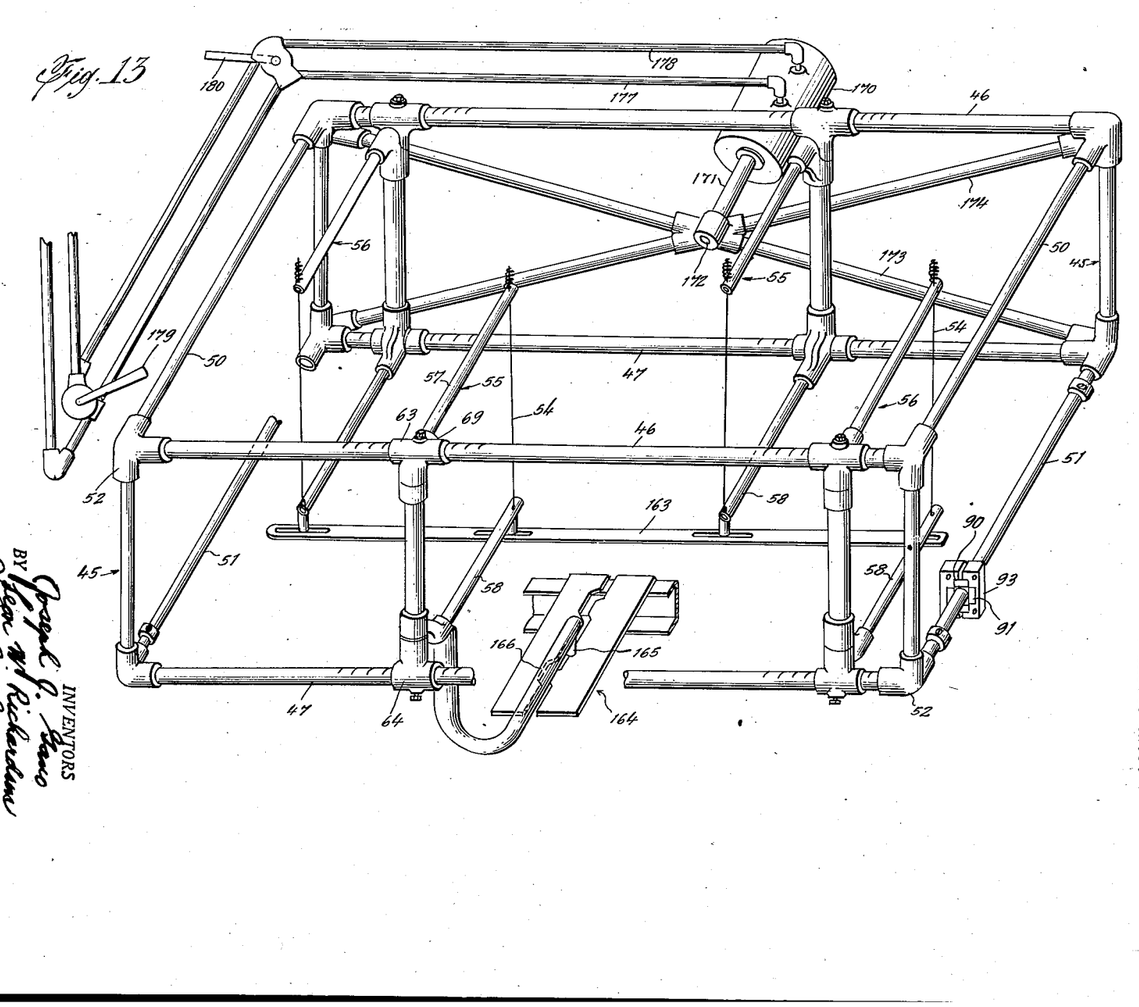
Fig. 13 is an isometric view of the transversely movable frame, the view showing a modified template arrangement, and also a hydraulic or pneumatic drive for the transversely movable frame.

The transversely movable frame 45 illustrated in Fig. 13 discloses another modification of the template arrangement, and also illustrates power means for moving the frame transversely of the column of moving clay to replace the manual means employed in the earlier embodiments of the invention. All four cutting wire frames 55 and 56 are conjointly movable due to drag link 163 which may be connected with lower arms 58 of such four frames. A single template 164 is suitably mounted on the carriage, and a roller 165 in the recess formed in the template is carried on an arm 166 which is connected with one of the intermediate cutting wire frames 55. Thus, arm 166 guides the drag link 163, and accordingly the other cutting wire frames.

The power driving means may comprise a cylinder 170 containing a piston (not shown) which is connected with piston rod 171, the outer end of the piston rod being connected at 172 to diagonal frame members 173 and 174 carried on one side of frame 45. The piston may be driven by hydraulic or pneumatic means, the fluid entering the cylinder through pipes 177 and 178, the pipes having control valves 179 and 180 which may be actuated in any desired fashion.

While three forms or embodiments of the invention have been shown and described herein for illustrative purposes, and the construction and arrangement incidental to three specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What we claim is:

1. A machine for making transverse cuts in a moving column of extruded plastic material to form blocks having recessed end walls of predetermined contour, such machine comprising a base support, a carriage mounted on the base support, means for permitting movement of the carriage in a direction parallel with the moving column during the cutting operation, an elongated platen on the upper side of the carriage for receiving the column, means for guiding movement of the column over the platen in a substantially straight line of travel relative to such platen, a frame structure carried by the carriage and being movable transversely of the column, a plurality of pairs of cutting wire frames pivotally mounted on a vertical axis on the frame structure, the frames in each pair being generally aligned transversely of the frame structure, each frame including interconnected upper and lower arms, and a cutting wire mounted between the outer ends of the arms, cam means carried by the carriage for guiding such outer ends to cause the cutting wire to make a cut of predetermined contour, a cam follower, and means connecting the cam follower with the outer ends of the cutting wire frames.

2. A machine for making transverse cuts in a moving column of extruded plastic material to form blocks having recesses in opposite end walls thereof of predetermined contour, such machine comprising a base support, a carriage mounted on the base support, means for permitting movement of the carriage in a direction parallel with the moving column during the cutting operation, an elongated platen on the upper side of the carriage for receiving the column, a frame structure, generally in the form of a hollow, rectangular parallelepiped, supported by the carriage and being movable transversely of the column, a plurality of pairs of cutting wire frames mounted in spaced relation on the frame structure on vertical axes and arranged to simultaneously cut a plurality of blocks with end walls having such recesses therein, a cutting wire mounted between the outer terminals of each frame, the frames in each pair being closely spaced adjacent each other so as to leave a minimum of waste material in the column between adjacent cuts, and cam means mounted in the carriage for guiding the outer ends of the cutting wire frames to form the recesses in the end walls of the blocks as the same are cut.

3. A machine for making transverse cuts in a moving column of extruded plastic material to form blocks having recesses in opposite end walls thereof of predetermined contour, such machine comprising a base support, a carriage mounted on the base support, means for permitting movement of the carriage in a direction parallel with the moving column during the cutting operation, an elongated platen on the upper side of the carriage for receiving the column, a skeleton frame structure supported by the carriage and being movable transversely of the column, such frame structure including spaced, generally rectangular frame elements extending longitudinally of the structure, and transversely disposed members connecting such frame elements, a plurality of pairs of cutting wire frames mounted in spaced relation on the frame structure on vertical axes and arranged to simultaneously cut a plurality of blocks with end walls having such recesses therein, a cutting wire mounted between the outer terminals of each frame, and cam means mounted in the carriage for guiding the outer ends of the cutting wire frames to form the recesses in the end walls of the blocks as the same are cut.

4. A machine for making transverse cuts in a moving column of extruded plastic material to form blocks having recesses in opposite end walls thereof of predetermined contour, such machine comprising a base support, a carriage mounted on the base support, means for permitting movement of the carriage in a direction parallel with the moving column during the cutting operation, an elongated platen on the upper side of the carriage for receiving the column, means for guiding movement of the column over the platen, a skeleton frame structure supported by the carriage and being movable transversely of the column, such frame structure including generally rectangular frame elements extending longitudinally of the structure, and transversely disposed members connecting such frame elements, a plurality of pairs of cutting wire frames mounted in spaced relation on the frame structure on vertical axes and arranged to simultaneously cut a plurality of blocks with end walls having such recesses therein, a cutting wire mounted between the outer terminals of each frame, the frames in each pair being closely spaced adjacent each other so as to leave a minimum of waste material in the column between adjacent cuts, and cam means mounted in the carriage for guiding the outer ends of the cutting wire frames to form the recesses in the end walls of the blocks as the same are cut.

5. A machine for making transverse cuts in a moving column of extruded plastic material to form blocks having recesses in the end walls thereof of predetermined contour, such machine comprising a base support, a carriage mounted on the base support, means for permitting movement of the carriage in a direction parallel with the moving column during the cutting operation, an elongated platen on the upper side of the carriage for receiving the column, a skeleton frame structure supported by the carriage and being movable transversely of the column, such frame structure including generally rectangular frame elements extending longitudinally of the structure, and transversely disposed members connecting such frame elements, a plurality of pairs of cutting wire frames mounted in spaced relation on the frame structure on vertical axes and arranged to simultaneously cut a plurality of blocks with end walls having such recesses therein, a cutting wire mounted between the outer terminals of each frame, the frames in each pair being transversely aligned so as to cause their respective cutting wires to traverse the same path except while cutting said recesses, and cam means mounted in the carriage for guiding the outer ends of the cutting wire frames to form said recesses in the end walls of the blocks as the same are cut.

JOSEPH J. GANO.
LEON W. RICHARDSON.

REFERENCES CITED

The following references are of record in the file of this patent:

UNITED STATES PATENTS

| Number | Name | Date |
|---|---|---|
| 1,110,371 | Barbour | Sept. 15, 1914 |
| 1,152,873 | Barbour | Sept. 7, 1915 |
| 1,214,360 | Park | Jan. 30, 1917 |
| 1,238,049 | Pearson | Aug. 21, 1917 |
| 1,944,464 | Richardson | Jan. 23, 1934 |
| 2,177,607 | Brown et al. | Oct. 24, 1939 |
| 2,391,424 | Keplinger et al. | Dec. 25, 1945 |

FOREIGN PATENTS

| Number | Country | Date |
|---|---|---|
| 20,510 | Great Britain | June 26, 1913 |